US009881016B1

(12) United States Patent
Bono et al.

(10) Patent No.: US 9,881,016 B1
(45) Date of Patent: Jan. 30, 2018

(54) UNIFIED SLICE MAP VOLUME

(71) Applicant: EMC Corporation, Hopkinton, MA (US)

(72) Inventors: Jean-Pierre Bono, Westboro, MA (US); Michal Marko, Fanwood, NJ (US); Rohit Chawla, Scotch Plains, NJ (US); Ye Zhang, Shanghai (CN); William Davenport, Burlington, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 403 days.

(21) Appl. No.: 14/588,065

(22) Filed: Dec. 31, 2014

(51) Int. Cl.
*G06F 17/30* (2006.01)

(52) U.S. Cl.
CPC .. *G06F 17/30153* (2013.01); *G06F 17/30132* (2013.01); *G06F 17/30203* (2013.01)

(58) Field of Classification Search
CPC .......... G06F 11/1435; G06F 17/30067; G06F 17/30129; G06F 17/30138
USPC ................................. 707/821, 822, 827, 825
See application file for complete search history.

(56) References Cited

U.S. PATENT DOCUMENTS

| 7,631,155 | B1 | 12/2009 | Bono et al. | |
|---|---|---|---|---|
| 7,694,191 | B1* | 4/2010 | Bono | G06F 11/004 |
| | | | | 714/48 |
| 8,037,345 | B1* | 10/2011 | Iyer | G06F 11/1004 |
| | | | | 714/20 |
| 8,407,265 | B1 | 3/2013 | Scheer et al. | |
| 8,566,371 | B1 | 10/2013 | Bono et al. | |
| 9,122,589 | B1* | 9/2015 | Bono | G06F 12/0246 |
| 9,152,353 | B1* | 10/2015 | Wang | G06F 3/0689 |
| 9,176,681 | B1* | 11/2015 | Xu | G06F 3/0631 |
| 9,256,614 | B1* | 2/2016 | Bono | G06F 17/30088 |
| 9,256,629 | B1* | 2/2016 | Bono | G06F 17/30197 |
| 9,298,555 | B1* | 3/2016 | Ai | G06F 11/1435 |
| 9,395,937 | B1* | 7/2016 | Si | G06F 3/0689 |
| 2006/0206603 | A1* | 9/2006 | Rajan | G06F 3/0605 |
| | | | | 709/223 |
| 2007/0124341 | A1* | 5/2007 | Lango | G06F 17/30067 |
| 2007/0250551 | A1* | 10/2007 | Lango | G06F 17/30067 |
| 2008/0005468 | A1* | 1/2008 | Faibish | G06F 3/0622 |
| | | | | 711/114 |

* cited by examiner

*Primary Examiner* — Hanh Thai
(74) *Attorney, Agent, or Firm* — BainwoodHuang

(57) ABSTRACT

Examples are generally directed towards a file server having a unified file system associated with a unified slice map volume. In one example, the unified file system stores file system metadata and sparse volume metadata within the unified slice map volume. The unified file system performs a unified set of functions using the file system metadata and sparse volume metadata in the unified slice map volume.

15 Claims, 10 Drawing Sheets

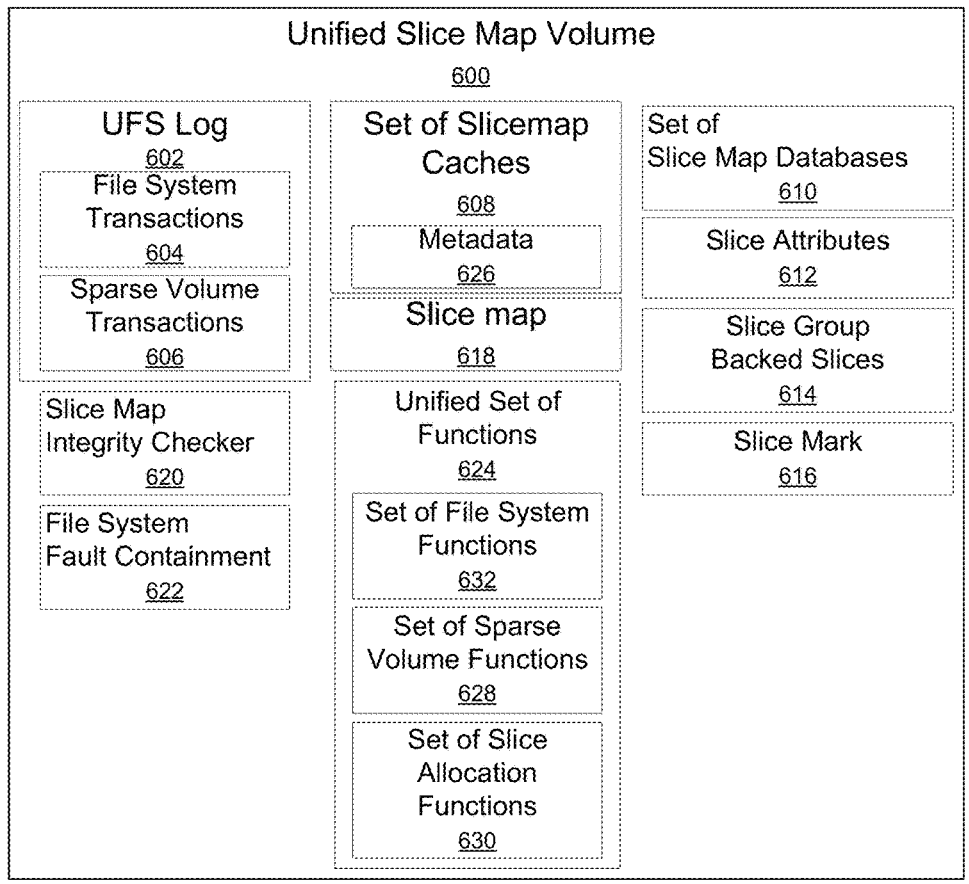

UNIFIED SLICE MAP VOLUME

BACKGROUND

In some systems, a file server is a computing device that provides shared storage of data files to one or more clients on a network. A file system typically provides access to files stored on a storage device to the one or more clients. A file is a collection of data. The shared files on a file server may include any type of data, such as documents, digital images, photos, movies, sound files, databases, or any other type of files. Files are typically stored or placed in a hierarchical directory or subdirectory of a file system.

File systems are being used to store and manage increasingly larger amounts of data stored in greater numbers of files than ever before. File systems store, manage, and track these files using metadata. File systems utilize and manipulate metadata to track the way files are stored, organized, and used by the file system. However, the same metadata may be duplicated in multiple different locations within the file server. Likewise, there may be many different components of the file server involved in creating, storing, and managing this metadata. This complexity results in a performance penalty.

SUMMARY

Examples of the disclosure provide for managing metadata associated with a file server. In an example, a computer-implemented method for managing metadata is provided. A unified file system stores sparse volume metadata associated with a passive sparse volume layer and file system metadata associated with a unified file system is stored within a unified slice map volume in data storage. The data storage includes one or more data storage devices. The sparse volume metadata comprises metadata describing a set of sparse volume functions and a state of one or more volumes of a passive sparse volume layer. The unified file system performs a set of sparse volume functions and a set of file system functions using the sparse volume metadata and file system metadata in the unified slice map volume.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 6 is an exemplary block diagram illustrating a unified slice map volume.

FIG. 7 is an exemplary block diagram illustrating slice allocation metadata within a unified slice map volume.

Corresponding reference characters indicate corresponding parts throughout the drawings.

DETAILED DESCRIPTION

Figure 1:
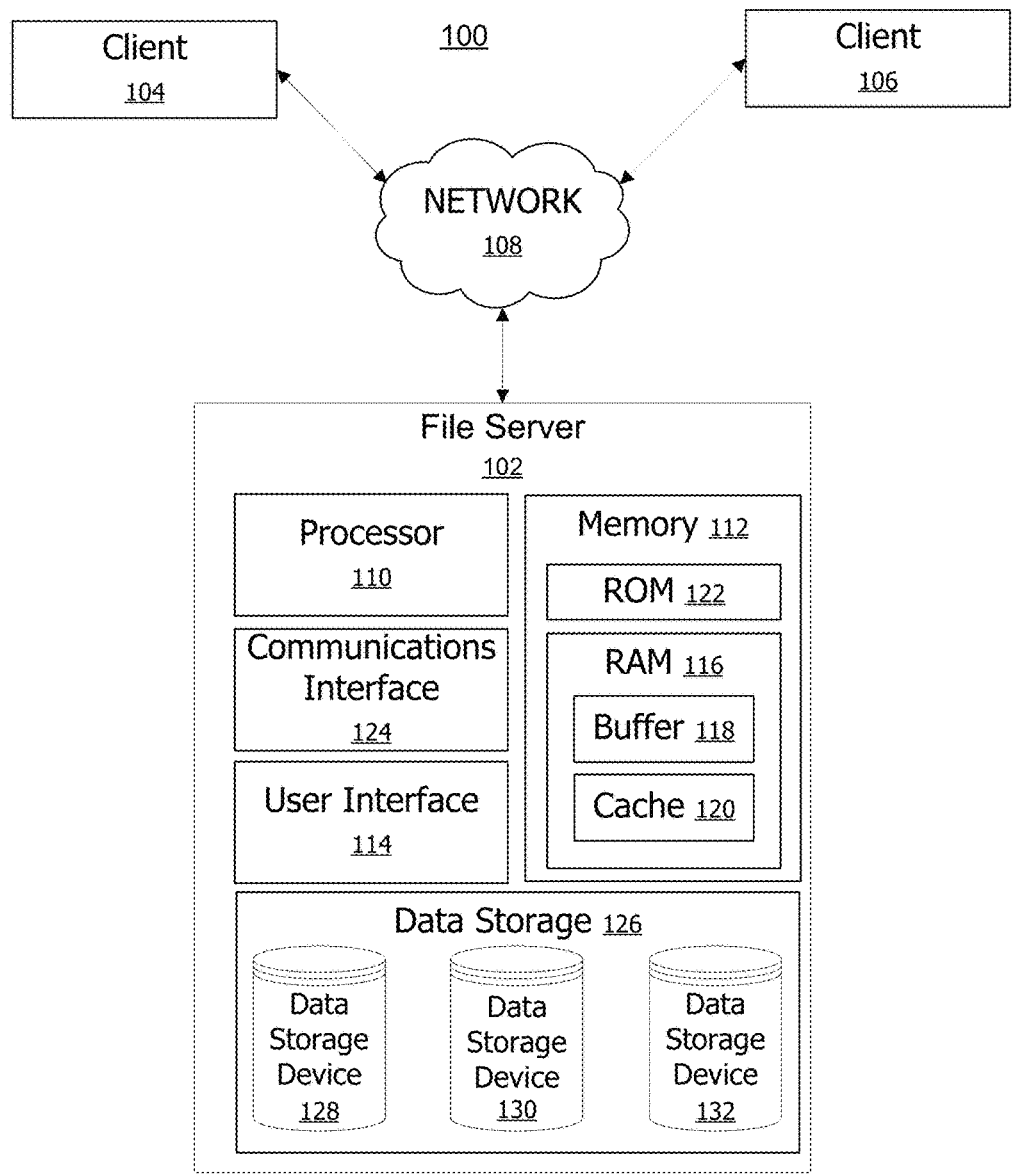
FIG. 1 is an exemplary block diagram illustrating a data processing system including a file server.

Referring to the figures, examples of the disclosure enable a unified slice map volume. Typically, in file server architecture, a file abstraction or volume file is utilized by several components. These components may include, without limitation, a slice manager, a sparse volume layer component, and one or more file systems.

A slice manager is a component that performs slice allocation management functions. The slice manager component utilizes a slice allocation table (SAT) to maintain a slice manager view of the slices of data storage.

A sparse volume layer is a component that manages a sparse logical volume. The sparse volume layer component creates stores, manages, and updates sparse volume metadata describing a state of the sparse volume within various sparse volume caches, sparse volume databases, and sparse volume data structures. The sparse volume layer stores sparse volume metadata within root slices. The sparse volume layer also performs various functions associated with the sparse volume layer. The sparse volume layer functions may include, without limitation, tracking, mapping, and/or allocating one or more volumes of data storage to a file for utilization by the file and/or file systems.

Each of these separate components create, store, utilize, and manipulate metadata associated with various versions of the file. Each of these components has their own view of the file and their own understanding of how the file is being consumed or used. The disclosure recognizes that complexity is created by having so many components involved in tracking how the file, file abstraction, and/or file volume is being used.

These different components manipulating the metadata at different layers of the file server architecture frequently results in conflict between the data. Conflicts occur where the metadata associated with one component is inconsistent or contradicts the metadata associated with a different component. For example, the sparse volume layer metadata may conflict with the file system metadata.

The number of components and locations involved in the storage and manipulation of this metadata creates complexity. This complexity results in a performance penalty.

Moreover, each of these components creates and stores metadata associated with the different versions of the file in different caches, databases, and data structures. The metadata is frequently duplicated in multiple locations. This duplication of databases, logs, and caches results in memory and data management inefficiency.

Aspects of the disclosure provides a unified file system having a unified slice map volume for storing and managing slice allocation metadata, sparse volume metadata, and file system metadata. Aspects of the disclosure further enable a unified file system that manages and performs a unified set of functions. The unified set of functions of the disclosure includes, in some examples, a set of file system functions, functions associated with the sparse volume layer, and slice allocation functions associated with slice management. The unified file system utilizes a unified slice map volume for managing metadata associated with the file system, sparse volume layer, and slice manager.

Other aspects of the disclosure further provide a slice map cache within the unified slice map volume for storing file system metadata, sparse volume metadata, and slice allocation metadata in a single component. This enables improved tracking of metadata, increased efficiency, and reduced memory footprint. This also prevents data conflicts. For example, the unified slice map volume prevents metadata at the sparse volume layer conflicting with metadata at the file system layer by consolidating all the sparse volume metadata and file system metadata within the unified slice map volume. The unified file system of the disclosure maintains all sparse volume metadata and file system metadata within the same unified slice map volume for improved data consistency and elimination of conflicts between data associated with different layers, components, or objects.

Thus, the unified file system and unified slice map volume conserve memory, reduces processor load, improves operating system resource allocation, reduces error rates, and prevents inconsistencies in the metadata. The unified file system also increases overall speed and efficiency during performance of sparse volume functions, slice allocations, and file system functions.

Figure 2:
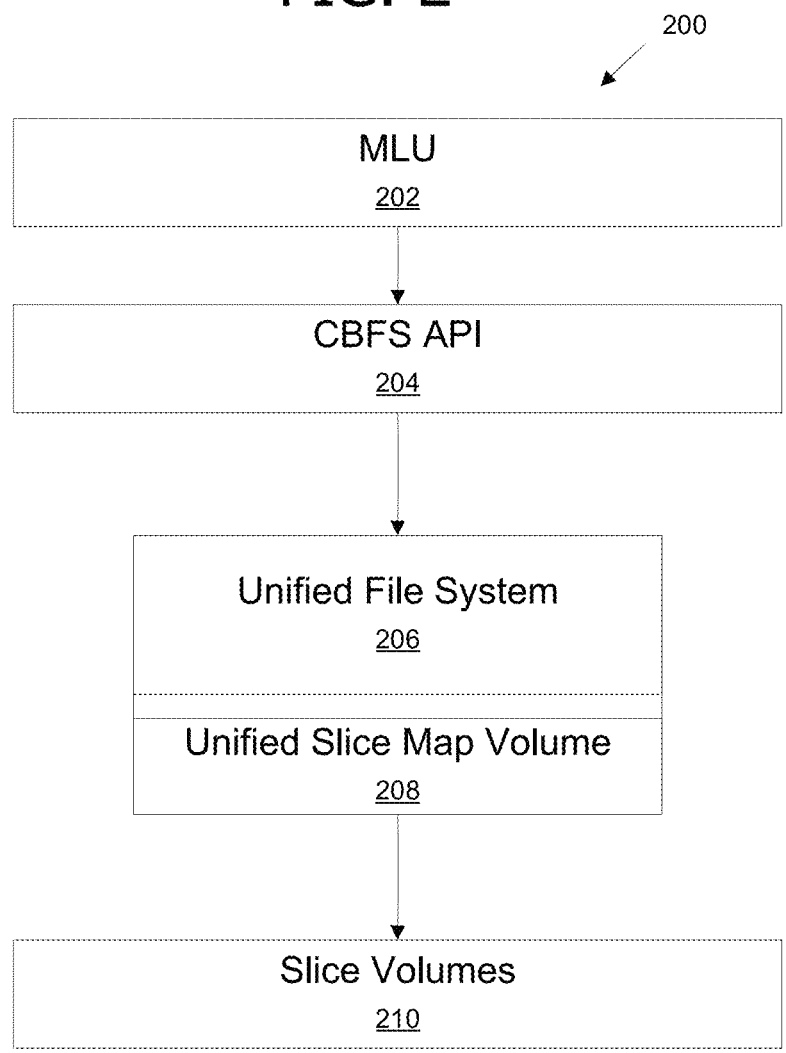
FIG. 2 is an exemplary block diagram illustrating a file server architecture including a unified file system.

In FIG. 1, an exemplary block diagram illustrates a network data processing system. The network data processing system 100 includes a file server 102 connected to one or more clients, such as client 104 and client 106, via network 108. The file server 102 is a computing device hosting one or more file systems, including a unified file system as shown in FIG. 2 below.

The file server 102 may be implemented as any type of computing device executing instructions (e.g., as application programs, operating system functionality, or both) to implement the operations and functionality associated with the file server 102. Likewise, client(s) 104 and/or client 106 may be implemented as any type of computing device capable of connecting to file server 102 via network 108.

However, in other non-limiting examples, the file server 102 may be a stand-alone file server that is not connected to a network. For example, in a different non-limiting embodiment, the system includes the file server and data storage without any network connection.

For example, a computing device may include any type of server or other computing device for hosting a file system. In some examples, the computing device includes a file server, a back-end server, or a cloud server. The computing device may also include devices including file systems or cloud computing configurations. Additionally, the computing device may represent a group of processing units or other computing devices.

In this example, the file server has at least one processor 110 and a memory 112. The processor 110 includes any quantity of processing units, and is programmed to execute computer-executable instructions for implementing aspects of the disclosure.

The instructions may be performed by the processor 110 or by multiple processors within the computing device, or performed by a processor external to the file server 102. In some examples, the processor 110 is programmed to execute instructions, such as those illustrated in FIG. 8, FIG. 9, FIG. 10, FIG. 11, and FIG. 12.

In some examples, the processor 110 represents an implementation of analog techniques to perform the operations described herein. For example, the operations may be performed by an analog computing device and/or a digital computing device.

The file server 102 further has memory 112. In some non-limiting examples, memory 112 includes one or more of a random access memory (RAM) 116, a read-only memory (ROM) 122, and/or a memory wired into an analog computing device. RAM 116 is a memory storage area on file server 102 that includes a buffer 118 and at least one cache 120 for temporary storage of volatile data. The memory 112 includes any quantity of media associated with or accessible by the file server 102.

The file server 102 may optionally include a user interface 114. In some non-limiting examples, the user interface 114 includes a graphics card for displaying data to a user and receiving data from the user. The user interface 114 may also include computer-executable instructions (e.g., a driver) for operating the graphics card. Further, the user interface component may include a display (e.g., a touch screen display or natural user interface) and/or computer-executable instructions (e.g., a driver) for operating the display.

The file server 102 may optionally include a communications interface 124. In some examples, the communications interface 124 includes a network interface card and/or computer-executable instructions (e.g., a driver) for operating the network interface card. Communication between the computing device and other devices may occur using any protocol or mechanism over any wired or wireless connection. In some examples, the communications interface is operable with short range communication technologies.

The file server 102 includes data storage 126. The data storage 126 includes one or more data storage devices, such as data storage devices 128, 130, and 132. A data storage device is any type of physical data storage, such as, but without limitation, a hard disk or disk drive. In a different example, the data storage 126 may include data storage devices arranged in a group to form a redundant array of inexpensive disks (RAID).

The data storage 126 may include one or more data storage devices internal to the file server 102, as shown in FIG. 1. However, in another example, the data storage 126 may include one or more data storage devices that are external to the file server 102, such as, but without limitation, a peripheral disk drive or flash drive. In yet another example, one or more data storage devices may be remote to the file server 102. The file server 102 may connect to the one or more remote data storage device via network 108.

The data storage 126 includes data storage space divided into a plurality of slices for storing data. Slices of data storage are allocated to one or more logical units (LUNs) of the physical storage. A collection of slices may form a pool of slices, also referred to as a slice pool.

The processor 110 is coupled to the data storage 126 for accessing data stored on the one or more data storage device, such as data storage device 128, 130, and/or 132. The data storage 126 stores, among other data, one or more applications. The applications, when executed by the processor 110, operate to perform functionality on the file server 102. Exemplary applications include mail application programs, web browsers, calendar application programs, address book application programs, messaging programs, media applications, location-based services, search programs, and the like.

The applications may communicate with counterpart applications or services such as web services accessible via the network 108. For example, the applications may represent downloaded client-side applications that correspond to server-side services executing in a cloud.

The memory 112 and/or the data storage 126 further stores one or more computer-executable components. Exemplary components include a unified file system and a unified slice map volume. The unified file system component, when executed by the processor of the file server 102, causes the processor to store sparse volume metadata, file system metadata, and slice allocation metadata within a unified slice map volume in data storage. The unified file system component, when executed by the processor of the file server 102, causes the processor to perform a unified set of functions, manage performance of one or more functions, update the metadata stored within the unified slice map volume, and perform various other functions associated with managing files, allocating volumes of data storage, and/or allocating slices of data storage to logical volumes (LUNs).

Referring now to FIG. 2, an exemplary block diagram illustrating a file server architecture including a unified file system is shown according to one or more example implementations. In this exemplary file server architecture 200, MLU 202 is associated with a slice allocation table (SAT) providing a view of the plurality of slices. Common Block File System Application Programming Interface (CBFS API) 204 is compatible with the unified slice map volume 208.

In file systems utilizing an active sparse volume, the API 204 performs functions/activities at both the sparse volume layer and the file system layer. If anything went wrong at one layer, it would result in problems at the other layer. However, in this example, the sparse volume is passive. The API 204, in this example, performs functions/orchestrates activities at the file system layer.

The unified file system 206 collapses one or more of the slice management functions of the MLU slice manager into the unified file system 206. The unified file system 206 stores and updates slice allocation status for each slice within the unified slice map volume 208 to increase data storage efficiency. In this manner, the unified file system 204 and unified slice map volume 208 provide code simplification and code reduction.

The unified file system 206 is layered or built on a passive, sparse, logical volume layer. The passive sparse volume layer is a thinly provisioned logical volume layer. The sparse volume layer is passive. The logical volume layer is a passive layer because the functions associated with the logical volume layer are performed by the unified file system 206. Metadata describing the logical volume layer state and logical volume functions are stored within the unified slice map volume 208.

An "active" logical volume layer performs function associated with the logical volume, creates metadata, updates metadata, manipulates metadata, and stores the metadata within sparse volume caches, databases, and sparse volume data structures, such as a root slice.

In contrast to an active sparse volume layer, the passive sparse volume layer of the disclosure does not utilize root slices, sparse volume caches, sparse volume databases, or otherwise maintain its own view of the slices. Instead, the unified file system 206 creates, stores, updates, and manipulates metadata associated with the sparse volume layer within the unified slice map volume 208. In other words, the unified file system performs the sparse volume layer functions associated with creating, caching, maintaining, and updating metadata. This prevents conflicts and inconsistencies in the metadata.

Slice volumes 210 are volumes of data storage associated with one or more slices of data storage and allocated to the unified file system 206. In another example, the file server architecture 200 may include a common block file system (CBFS) Volumes.

In this example, the file server architecture 200 includes a single file system 206 and a single unified slice map volume 208. However, in some other non-limiting examples, the file server architecture may include two or more unified file systems and/or two or more unified slice map volumes.

Figure 3:
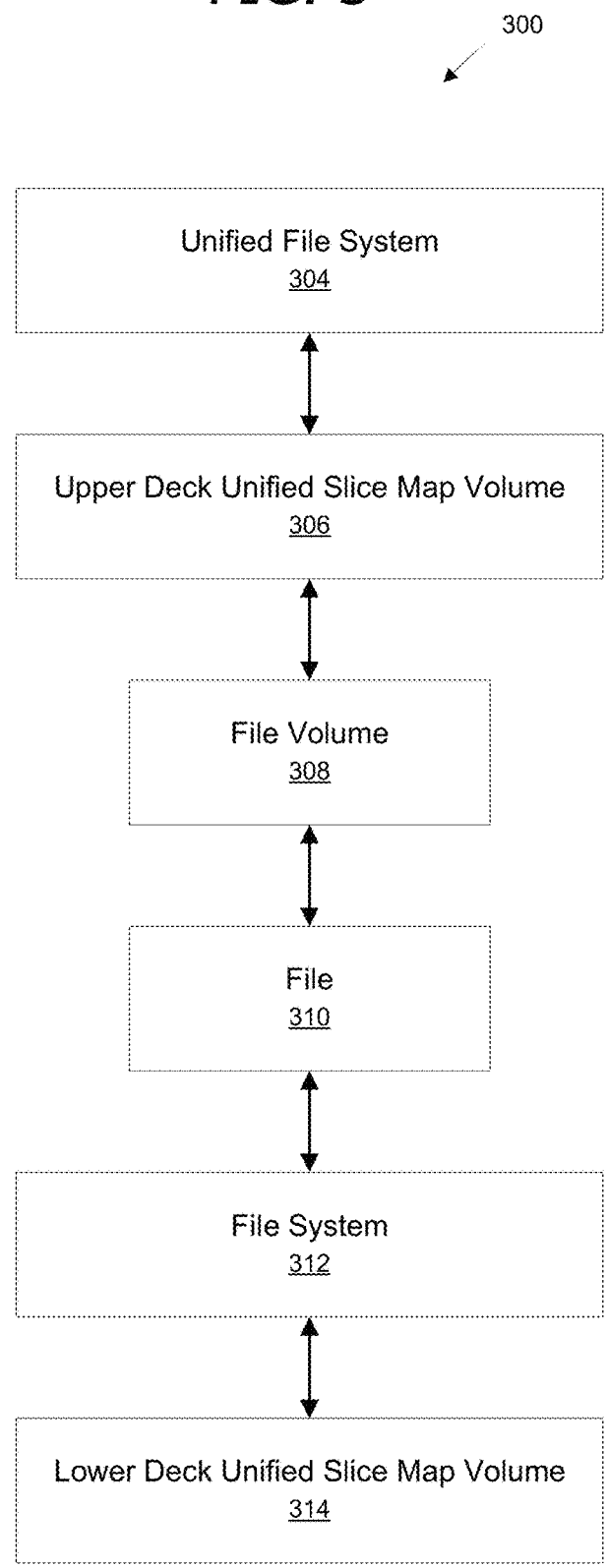
FIG. 3 is an exemplary block diagram illustrating a file server architecture having upper deck unified slice map volume.

FIG. 3 is an exemplary block diagram illustrating a file server architecture having an upper deck unified slice map volume, according to one or more example implementations. In this example, a unified file system 304 is an upper deck file system associated with an upper deck unified slice map volume 306. The upper deck unified slice map volume 306 is compatible with the CBFS API 204. The upper deck unified slice map volume 306 does not utilize root slices. The sparse volume root slice metadata is stored within the file system data structures.

This exemplary architecture 300 does not include a slice manager for the upper deck. In other words, a stand-alone slice manager is not utilized or included within the architecture 300. Instead, the unified file system 304 tracks slice usage data and stores slice allocation metadata within the upper deck unified slice map volume 306.

The unified slice map volume 306 is used by the unified file system 304 to consume or utilize a file volume 308 and/or a file 310. In this example, the file 310 is coming out of a lower deck file system 312. The lower deck file system 312 in some non-limiting examples is a container file system. A lower deck unified slice map volume 314 is below the container file system. The lower deck unified slice map volume 314 stores sparse volume metadata, slice allocation metadata, and file system metadata.

The second unified slice map volume enables improved fault containment. The unified slice map volume is duplicated. If one unified slice map volume is lost or becomes corrupted, the unified file system utilizes the data in the second unified file system for fault containment and recovery.

Moreover, the examples are not limited to a lower deck container file system. In other non-limiting examples, the lower deck file system 312 is a common block file system (CBFS) or some other lower deck file system.

In this example, both the upper deck unified slice map volume 306 and the lower deck unified slice map volume 314 are used. However, in a different example, only the upper deck unified slice map volume 306 is utilized by the unified file system 304. In this example, utilizing only the upper deck unified slice map volume 306 is less disruptive to the lower deck file system.

Figure 4:
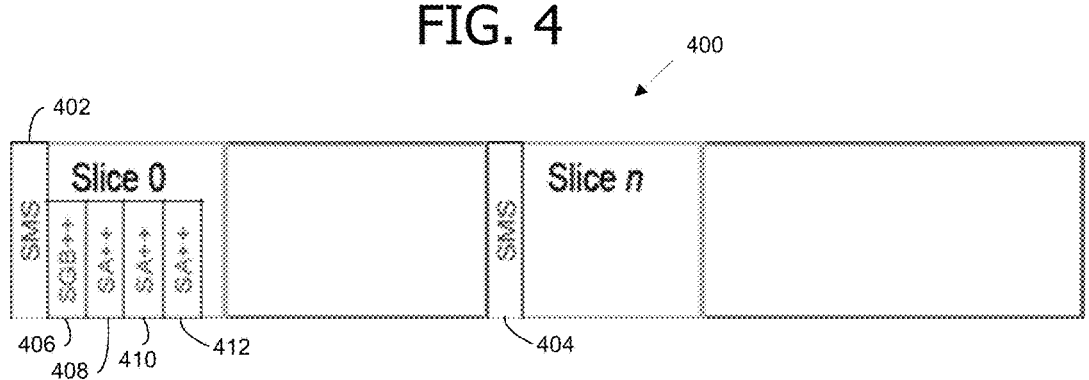
FIG. 4 is an exemplary block diagram illustrating an on-disk layout of a slice.

FIG. 4 is an exemplary block diagram illustrating an on-disk layout of a slice, according to one or more example implementations. Data storage space within the data storage 126 may be divided into portions referred to as a slice, such as slice 400.

Sparse volume metadata, slice metadata, and file system metadata are stored in file system data structures associated with the slice. In one non-limiting example, Slice Mark Sectors (SMS) 402 and 404 are data structures storing a device and offset of a relocation target. The Slice Mark Sectors 402 and 404 are used by a file system, such as the unified file system 206, for re-locating slices from one logical address space to another.

The sgBackedSlices (SGB) 406 is a data structure for slice group backed slices. In this example, the uniform slice map volume is a hierarchy having multiple levels. The slice group is the highest level of the slice map hierarchy.

In an example, the sgBackedSlices (SGB) 406 is increased in size by 16 bytes and covers a larger sub-tree of the uniform slice map volume hierarchy. The sgBackedSlices (SGB) 406 stores a device and offset of a slice that was previously stored in a sparse volume layer. However, because the sparse volume layer of this example is a passive sparse volume layer, the device and offset of the slice is stored in the sgBackedSlices data structure of each slice.

In this non-limiting example, for every sixteen (16) terabytes, there is a sgBackedSlices data structure. A device and offset of each slice of sixteen (16) terabytes is stored in that sgBackedSlices data structure.

Slice attributes (SA) 408, 410, and 412 data structures are used by a file system to store slice attributes for each slice. The slice attributes 408, 410, and 412 are stored on disk as a contiguous sequence. In this example, the slice attributes data structures are increased in size by 16 bytes. The slice attributes data structure stores a device and offset of a slice.

The slice attributes data structure does not store linkage information. In other words, this example does not utilize a link list to link slices together at the volume layer. Volume recovery has fewer types of corruption to handle in this example, because there are no longer issues associated with linkage corruption (SME_LINKAGE_CORRUPTED). In other words, eliminating the linkage information from the slice attributes data eliminates the occurrence of linkage data corruption and simplifies volume recovery processes.

Moreover, the slice 400 in this example does not include a root slice. In file servers utilizing an active sparse volume layer component, each time a slice was added to the file system, a root slice associated with the active sparse volume layer was also added. However, in this example, the passive sparse volume layer component does not require a root slice. The metadata that would previously have been stored in a root slice for utilization by an "active" sparse volume layer component is now stored within the file system data structures, such as, but without limitation, data structures 402, 408, 410, and 412 discussed above.

In an example, utilizing the unified slice map volume and unified file system eliminates all root slices associated with the plurality of slices. The metadata that was stored in the root slices in this example is stored within the unified slice map volume of the unified file system. The root slice metadata is distributed across the file system data structures.

The elimination of root slices permits the file system to utilize smaller slice sizes. For example, slice sizes may be reduced from one gigabyte (1 GB) to 256 megabytes (256 MGs) because this example stores root slice data in the unified slice map volume instead of storing the data in a root slice.

Thus, this example provides better metadata scalability for smaller slice sizes because no root slices are needed in this example. The elimination of root slices also provides code reduction and code simplification because the code required to create root slices is no longer needed by the file system.

Moreover, fewer types of corruption are handled by volume recovery because the root slices have been eliminated. In other words, the absence of root slices eliminates root slice corruption. Therefore, performance of root slice recovery is unnecessary. This simplifies the volume recovery processes. However, in other examples, a root slice recovery may be performed in combination with the implementations of the disclosure.

Figure 5:
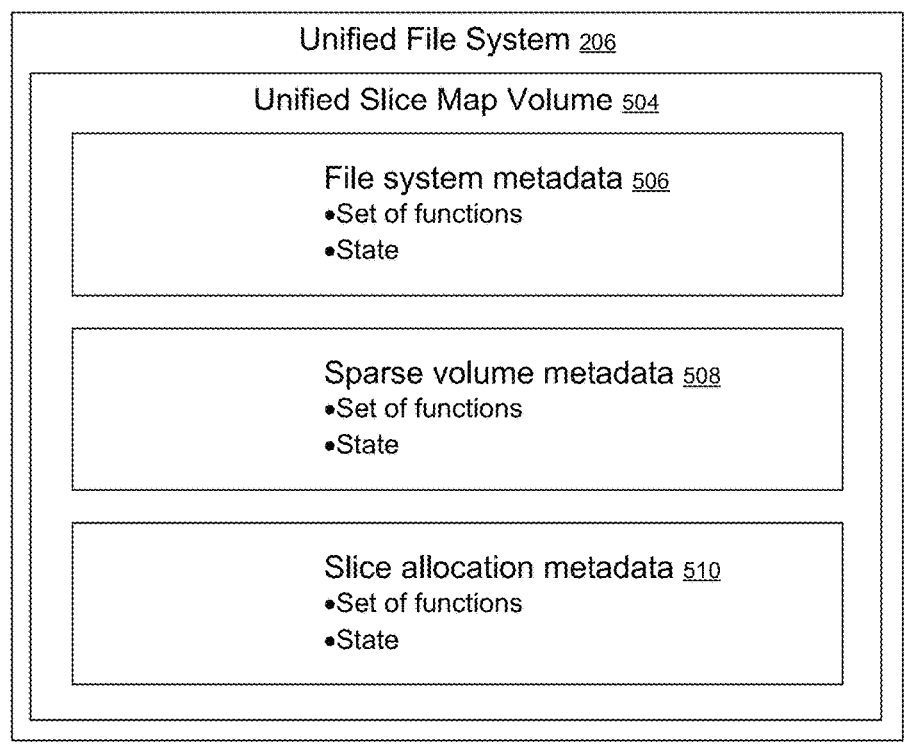
FIG. 5 is an exemplary block diagram illustrating a unified file system.

FIG. 5 is an exemplary block diagram illustrating a unified file system, according to one or more example implementations. The unified file system 206 utilizes a unified slice map volume 504 to manage metadata associated with one or more files and/or file system objects, such as, but without limitation, file 310, file volume 308, and/or a file abstraction.

The unified slice map volume 504 comprises file system metadata 506. The file system metadata 506 includes metadata describing a unified set of functions associated. As used herein, the term "set" refers to one or more. Thus, the unified set of functions includes one or more functions associated with a file system, a sparse volume layer, and/or a slice allocation manager.

Non-limiting examples of file system functions include a create a file system function, a mount file system function, an unmount file system function, a re-mount file system function, input/output (I/O) functions, file system transaction logging, file system integrity checker function, and file system fault containment. However, the set of file system functions are not limited to those listed above.

For example, the set of file system functions may include any other functions such as, but without limitation, a pause or extendLock function used during slice relocation. I/O draining is simplified by using pause function. Reading/writing of the Slice Mark data structure is protected using extendLock during slice relocation.

The file system metadata 506 also includes metadata describing a state of a file system. The state of the file system may include transactions performed by the file system, file system operations performed, as well as any other data associated with a state of the file system.

The unified slice map volume 504 stores sparse volume metadata 508. The sparse volume metadata 508 includes metadata describing a state of one or more slice volumes 210 associated with the passive sparse volume layer.

The sparse volume metadata 508 also includes metadata describing a set of functions associated with the slice volumes 210 of the passive sparse volume layer. This set of functions associated with the one or more slice volumes 210 are referred to herein as the set of sparse volume functions. The set of sparse volume functions include, for example but without limitation, add slice, sparse volume integrity checker, sparse volume recovery, and swap volume functions.

Slice allocation metadata 510 includes metadata describing a state of one or more slices, such as slice 400. The slice allocation metadata 510 also includes metadata describing a set of functions associated with sliced allocation. The set of slice allocation functions includes one or more slice allocation functions. The unified file system provides simplified slice management performing the set of slice allocation functions.

The slice allocation metadata 510 identifies whether a given slice is allocated to a LUN or free (un-allocated). A free slice is a slice of data storage that has not yet been allocated to a LUN of data storage 126.

In some non-limiting examples, a slice allocation function in the set of slice allocation functions includes, without limitation, one or more of a slice allocation function, a slice de-allocation function, a re-allocate slice function, and/or a remove slice function. The set of slice allocation functions may include other functions associated with a slice manager, or other slice allocation component.

FIG. 6 is an exemplary block diagram illustrating a unified slice map volume, according to one or more example implementations. A unified slice map volume 600 includes one or more caches, databases, logs, and/or data structures for storing, managing, and organizing metadata.

In this non-limiting example, the unified slice map volume 600 includes a unified file system (ufs) log 602. The ufs log 602 includes a log of file system transactions 604 and sparse volume transactions 606. The ufs log 602 includes file system log entries and sparse volume log entries. The unified file system logs file system transactions and sparse volume transactions in the ufs log 602.

The data stored in the ufs log 602 is utilized by the file system to manage files and perform functions associated with the file system. For example, but without limitation, the unified file system uses the file system transactions 604 and sparse volume transactions 606 data stored in the ufs log 602 to implement slice relocations. Likewise, volume recovery and pool recovery utilizes ufs log 602 data. During volume recovery, the ufs log 602 is replayed to obtain a view of the volumes.

A set of slice map caches 608 is a set of one or more caches for storing metadata 626 associated with the unified slice map volume 600. In an example, the set of slice map caches is a single unified cache. In another example, the set of slice map caches 608 includes two or more caches. For example, the set of slice map caches 608 may include a slice map cache, a slice cache, a slice mark sector cache, and/or a sparse volume cache.

The set of slice map caches 608 replaces the sparse volume caches that were previously used to store sparse volume metadata. In other words, an "active" sparse volume layer utilizes various sparse volume caches to store and maintain sparse volume metadata. However, in this example, the sparse volume layer is "passive". The passive sparse volume layer does not create, store, or maintain metadata in sparse volume caches. In fact, in this example, the file server does not include any sparse volume layer caches. Instead, the sparse volume metadata is stored and maintained within one or more caches of the set of slice map caches.

In some non-limiting examples, the set of slice map caches 608 eliminates a sliceCache, a SMScache and a SliceDataBase previously used to store sparse volume metadata. The elimination of these caches result in a reduced memory footprint, better scalability, improved performance, code simplification, and code reduction because there is a reduced number of caches and the active sparse volume layer is gone.

More specifically, in another example, utilization of the set of slice map caches 608 combined with elimination of the set of sparse volume caches results in a savings of approximately 464 bytes per slice and/or a sixty percent reduction in size of data structures and cache sizes.

In an example, the unified file system stores or caches file system data and sparse volume data in one or more of the caches in the set of slice map caches. In another example, the unified file system stores file system metadata and slice allocation metadata in one or more of the caches in the set of slice map caches. In yet another example, the unified file system stores file system metadata, sparse volume metadata, and slice allocation metadata in one or more of the caches in the set of slice map caches.

Set of slice map databases 610 is a set of one or more databases. The unified file system stores data associated with a file system, a slice allocation component, and a logical volume component within the set of slice map databases.

The unified file system stores slice attribute data within a slice attributes 612 data structure within the unified slice map volume 600. Data structures within the unified slice map volume 600 include slice attributes 612, slice group backed slices (sgbackedSlices) 614 and slice mark 616. Slice state metadata is maintained in the slice mark data structures and the slice attributes data structures.

The slice mark 616 metadata and sgbackedSlices 614 are used for sparse volume recovery. During sparse volume recovery, slice views are collected from the slice allocation table file system, slice mark, and slicer map entry (SME). The slice map entry view of the slices is obtained by reading the SgBacked Slices and SliceAttributes block.

The slice map 618 maintains a hierarchical view of the plurality of slices in the data storage. In this example, the slice map 618 stores a deviation and offset for each slice. The slice map 618 implements sparse volume management interface, such as SVMO and SVMO_Ops interfaces.

A slice map integrity checker 620 is a file system integrity checking component. The slice map integrity checker 620 performs an integrity check function on file system metadata and sparse volume metadata stored in the unified slice map volume.

File system fault containment 622 performs fault containment associated with a file system and/or a passive logical volume layer. File system fault containment 622 utilizes file system metadata and sparse volume metadata to perform one or more fault containment functions.

Unified set of functions 624 is a set of one or more functions performed by the unified file system based on file system metadata, slice allocation metadata, and/or passive sparse volume layer metadata stored within the unified slice map volume. In this non-limiting example, the unified set of functions 624 includes a set of file system functions 632, a set of sparse volume functions 628, and a set of slice allocation functions 630. However, in a different example, the unified set of functions 624 includes a set of file system functions 632 and a set of slice allocation functions 630. In yet another example, the unified set of functions 624 includes a set of file system functions 632 and a set of sparse volume functions 628.

The examples are not limited to the components shown in FIG. 6. The unified slice map volume may include other additional data structures, caches, databases, and components not shown in FIG. 6. For example, the unified slice map volume may include a containedSliceVolume data structure storing relocate input/output (I/O) state metadata. In this example, maintains the metadata associated with relocate I/O state.

FIG. 7 is an exemplary block diagram illustrating slice allocation metadata within a unified slice map volume, according to one or more example implementations. Unified slice map volume 700 includes slice allocation metadata 510. The slice allocation metadata 510 includes an allocation status entry for each slice in a plurality of slices. The unified file system accesses the slice allocation metadata 510 in the unified slice map volume to determine whether a given slice is allocated to a LUN or free.

In this example, the unified slice map volume 700 includes slice allocation status entry 704 for Slice 0. The slice allocation status entry 704 indicates that slice 0 is allocated 706 to LUN 0. The slice allocation status entry 708 indicates that slice 1 is allocated and pending 710 to LUN 0. The slice allocation status entry 712 in the slice allocation metadata 510 indicates that slice 2 is free 714. A free slice is an un-allocated slice of data storage.

Figure 8:
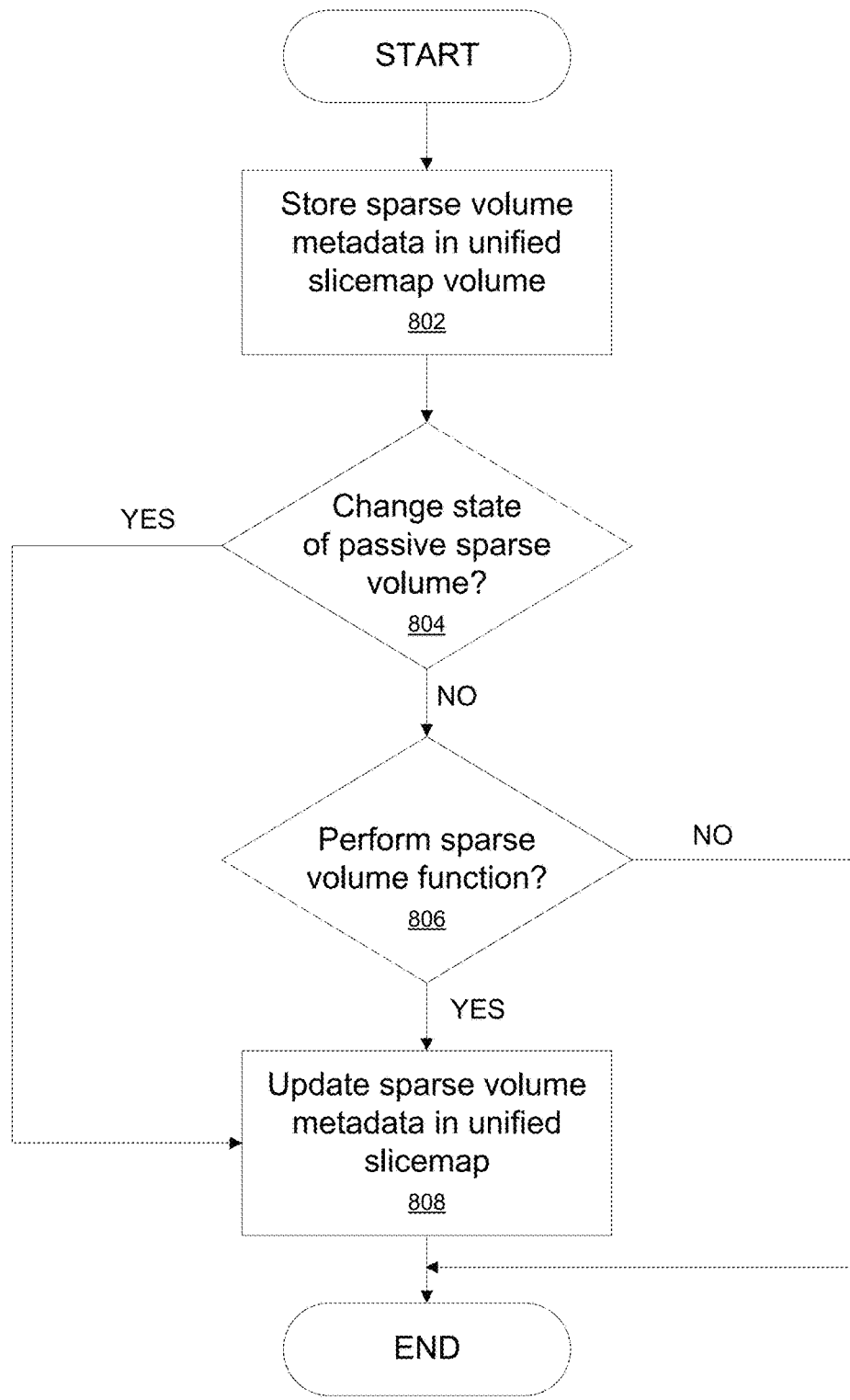
FIG. 8 is an exemplary flow chart illustrating operation of the unified file system to manage sparse volume metadata in a unified slice map volume.

FIG. 8 is an exemplary flow chart illustrating operation of the file system to manage sparse volume metadata in a unified slice map volume, according to one or more example implementations. The process shown in FIG. 8 is implemented by a unified file system component, such as unified file system 206.

The process begins by storing sparse volume metadata in a unified slice map volume (operation 802). A determination is made as to whether a change in a state of one or more volumes of the passive sparse volume layer has occurred (operation 804). If a state of one or more volumes of the passive sparse volume layer did not change, a determination is made as to whether a sparse volume function has been performed (operation 806). If a sparse volume function has not been performed, the process terminates.

Returning to operation 804, if a determination is made that a change in a state of one or more volumes of the passive sparse volume layer has occurred, the process updates the sparse volume metadata in the unified slice map volume (operation 808). The process terminates thereafter.

Returning now to operation 806, if the process determines that a sparse volume function has been performed, the process updates the sparse volume metadata in the unified slice map volume (operation 808). The process terminates thereafter.

Figure 9:
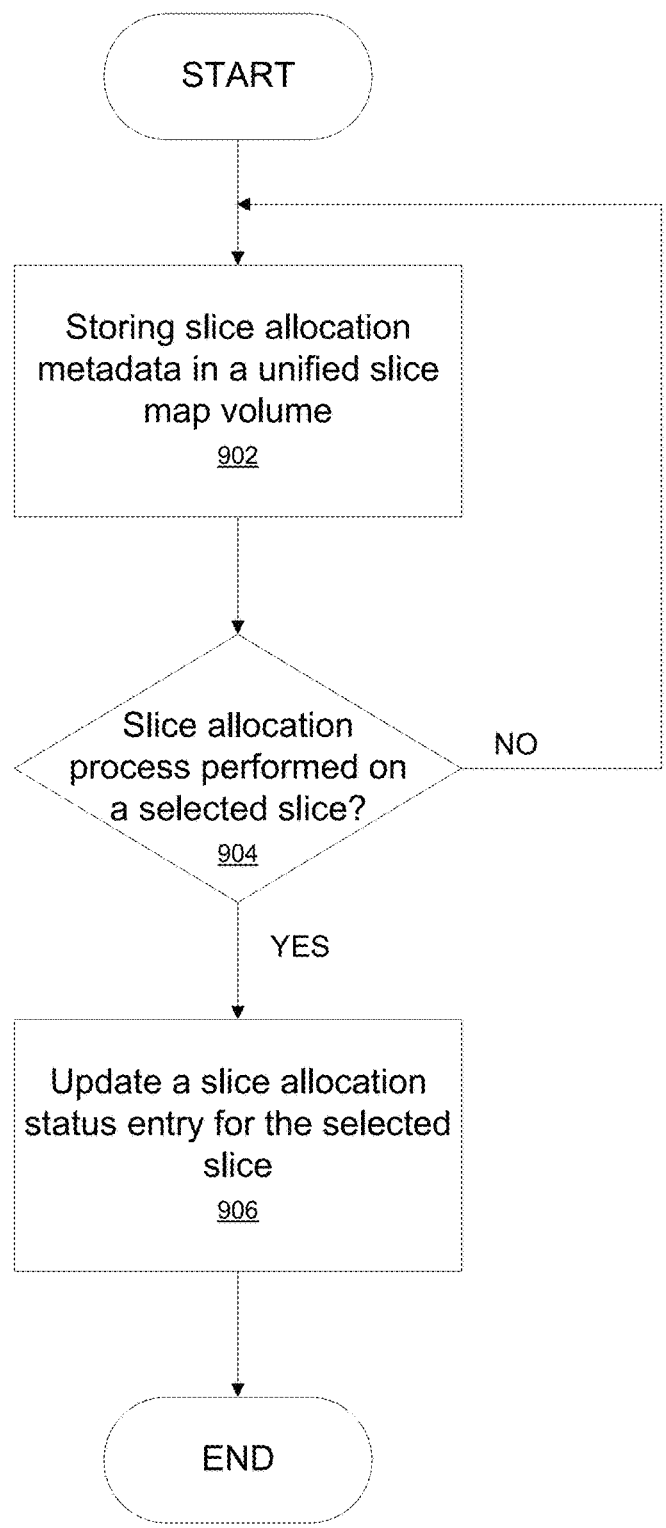
FIG. 9 is an exemplary flow chart illustrating operation of the unified file system to manage slice allocation metadata in a unified slice map volume.

FIG. 9 is an exemplary flow chart illustrating operation of the file system to manage slice allocation metadata in a unified slice map volume, according to one or more example implementations. The process shown in FIG. 9 is implemented by a unified file system component, such as unified file system 206.

The process begins by storing slice allocation metadata in a unified slice map volume (operation 902). The process makes a determination as to whether a slice allocation process has been performed on a selected slice (operation 904). If no, the process returns to operation 902.

Returning to operation 904, if a slice allocation process has been performed on a selected slice, the process updates a slice allocation status entry for the selected slice (operation 906). The process terminates thereafter.

Figure 10:
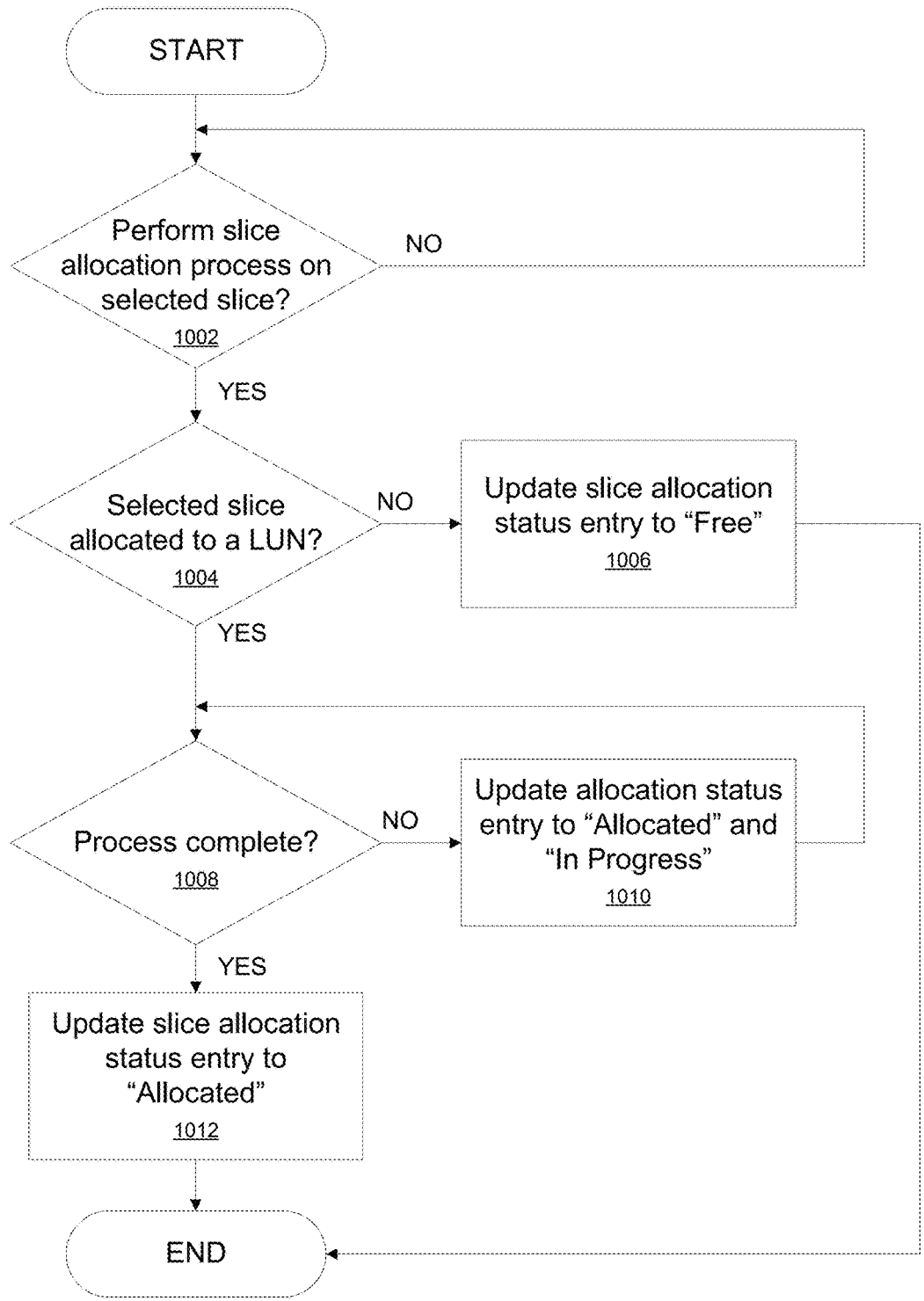
FIG. 10 is an exemplary flow chart illustrating operation of the unified file system to update slice allocation metadata stored in a unified slice map volume.

FIG. 10 is an exemplary flow chart illustrating operation of the file system to update slice allocation metadata stored in a unified slice map volume, according to one or more example implementations. The process shown in FIG. 10 is implemented by a unified file system component, such as unified file system 206.

The process begins by making a determination as to whether a slice allocation process was performed on a selected slice (operation 1002). If no, the process returns to operation 1002. If yes, the process makes a determination as to whether the selected slice is allocated to a logical unit (LUN) (operation 1004). If no, the process updates the slice allocation status entry to "Free" (operation 1006). The process terminates thereafter.

Returning to operation 1004, if the selected slice is allocated to a LUN, the process makes a determination as to whether the slice allocation process is complete (operation 1008). If no, the process updates an allocation status entry for the selected slice to "Allocated" and "In Progress" (operation 1010). The process returns to operation 1008. If the process at operation 1008 determines that the slice allocation process is complete, the process updates a slice allocation entry for the selected slice to "Allocated" (operation 1012). The process terminates thereafter.

Figure 11:
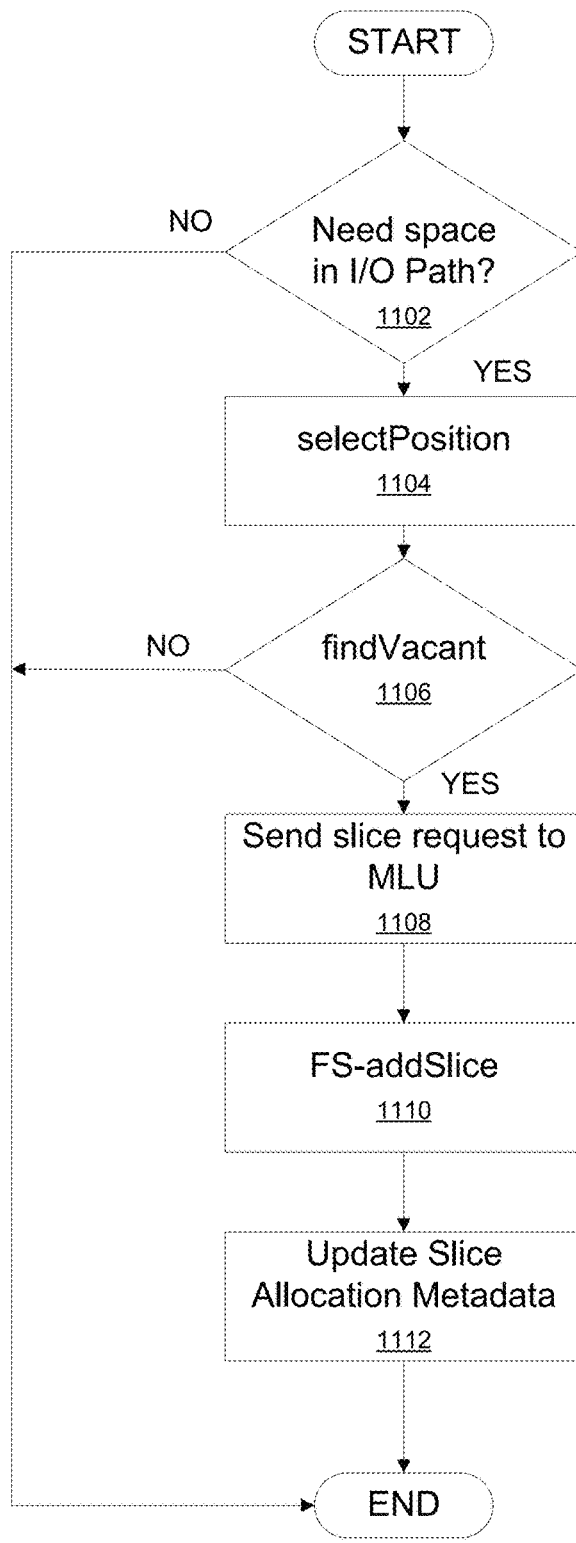
FIG. 11 is an exemplary flow chart illustrating operation of the unified file system to perform an add slice operation.

FIG. 11 is an exemplary flow chart illustrating operation of the file system to perform an add slice operation, according to one or more example implementations. The process shown in FIG. 11 is implemented by a unified file system component, such as unified file system 206.

The process begins by determining whether space is needed in an I/O (input/output) path (operation 1102). If space is not needed, the process terminates thereafter.

Returning to operation 1102, if space is needed, the process performs a select position function (operation 1104). The process makes a determination as to whether a vacant slice is available (operation 1106). If no, the process terminates thereafter. If a slice is vacant at operation 1106, the process sends a slice request to the MLU (operation 1108).

The process performs an add slice function (operation 1110) and updates the slice allocation metadata (operation 1112) to indicate that the slice has been allocated to the I/O path. The process terminates thereafter.

Figure 12:
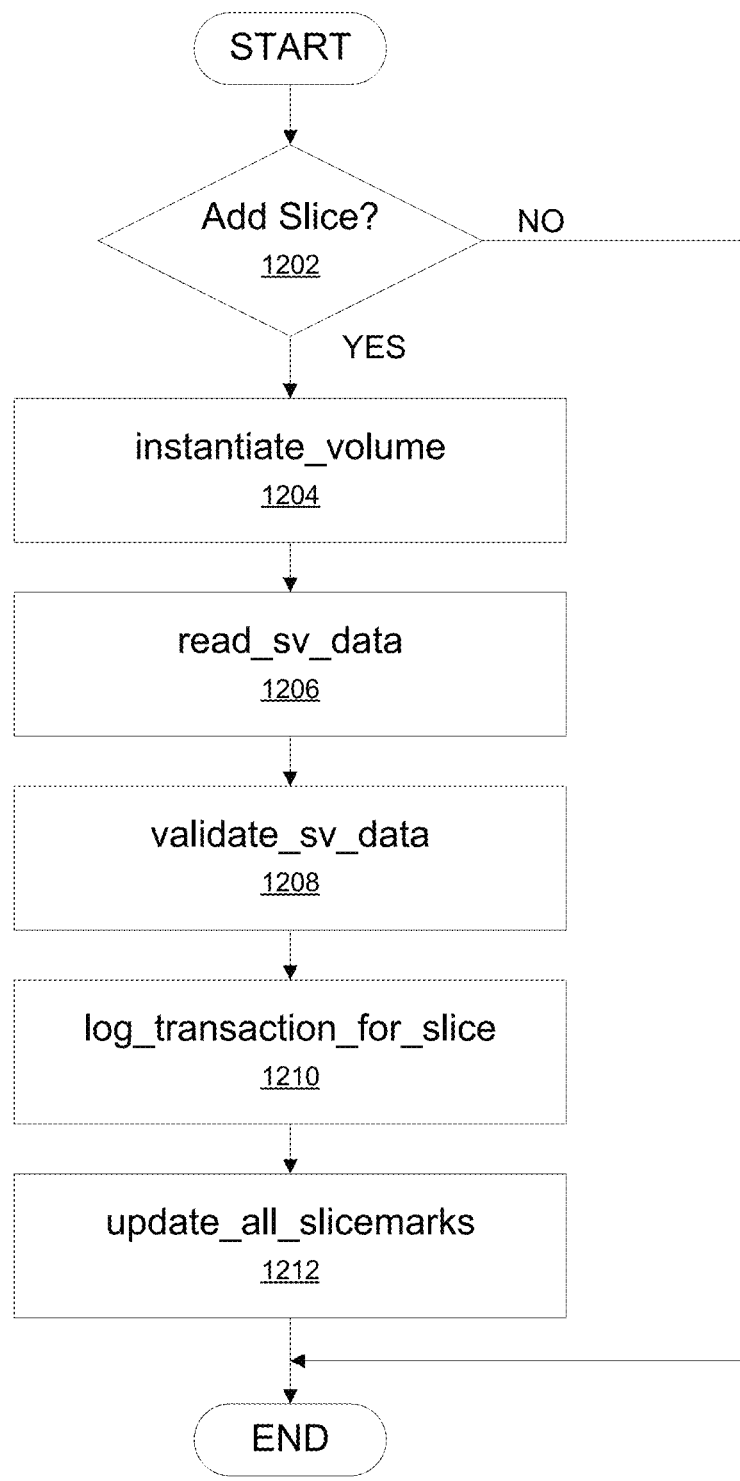
FIG. 12 is exemplary flow chart illustrating operations of the unified file system to perform a sparse volume add slice function.

FIG. 12 is exemplary flow chart illustrating operations of the file system to perform a sparse volume add slice function, according to one or more example implementations. The process shown in FIG. 12 is implemented by a unified file system component, such as unified file system 206.

The process begins by making a determination as to whether to perform an add slice function (operation 1202). If no, the process terminates. If yes, the process performs an instantiate_volume operation (operation 1204). The process reads slice volume data (operation 1206) from sparse volume metadata. The process validates slice volume data (1208). The process logs the transaction for the slice (operation 1210) in the unified file system log. The process updates all slice marks (operation 1212) in the slice mark data structure of the unified slice map volume. The process terminates thereafter.

FIG. 11 and FIG. 12 illustrate non-limiting example functions within an application programming interface (API) for implementing the operations described therein. However, aspects of the disclosure contemplate other functions for implementing these operations.

While the operations illustrated in FIG. 8, FIG. 9, FIG. 10, FIG. 11, and FIG. 12 are described as being performed by the unified file system 206, aspects of the disclosure contemplate performance of the operations by entities other than the unified file system 206. For example, the lower deck file system 312 or other file system component of the file server 102 may perform one or more of the operations.

It should be understood that any of the examples herein are non-limiting. For instance, one or more examples used herein refer to a file server hosting one or more file systems. However, this is only one example, and other servers or computing devices may benefit from the technology described herein. Also, the examples shown in the figures are non-limiting. For example, in FIG. 1, three data storage devices are shown. However, it can be readily appreciated that the examples may be extended to a system with a single data storage device, two data storage devices, as well as more than three data storage devices.

As such, the present disclosure is not limited to any particular examples, aspects, concepts, structures, functionalities or examples described herein. Rather, any of the examples, aspects, concepts, structures, functionalities or examples described herein is non-limiting, and the present disclosure may be used various ways that provide benefits and advantages data storage and computing in general.

In some examples, one or more of the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, multiprocessor systems, microprocessor-based systems, programmable consumer electronics, network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for managing metadata. For example, the elements illustrated in FIG. 1, FIG. 2, FIG. 3, FIG. 4, FIG. 5, FIG. 6, and FIG. 7, such as when encoded to perform the operations illustrated in FIG. 8, FIG. 9, FIG. 10, FIG. 11, and FIG. 12, constitute exemplary means for managing metadata in a unified slice map volume by a unified file system.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A file server comprising:
    a data storage, the data storage comprising one or more data storage devices and a plurality of slices of the data storage;
    a processor coupled to the data storage for accessing data stored on the one or more data storage devices; and
    a unified file system component comprising a unified slice map volume,
    wherein the file server has a file server architecture including a file system layer and a passive sparse volume layer, the file system layer having associated file system metadata describing a state of the unified file system and a set of file system functions, and the passive sparse volume layer having associated sparse volume metadata describing a set of sparse volume functions and a state of one or more volumes in the passive sparse volume layer,
    wherein the unified slice map volume is operative to store the sparse volume metadata, the file system metadata, and slice allocation metadata comprising a slice allocation status of each slice in the plurality of slices, and
    wherein the unified file system is operative:
        to perform a unified set of functions that include the file system functions and the sparse volume functions, the sparse volume functions being associated with one or more of creating, caching, maintaining, and updating the sparse volume metadata associated with the passive sparse volume layer; and to update a slice allocation status entry for a selected slice in the plurality of slices in response to performance of a slice allocation process allocating the selected slice to a logical unit of the data storage.

2. The file server of claim 1, wherein the unified slice map volume comprises:

a set of slice map caches, wherein the unified file system caches sparse volume data and file system data within the set of slice map caches of the unified slice map volume; and a unified file system log comprising file system log entries and sparse volume log entries, wherein the unified file system logs file system transactions and sparse volume transactions in the unified file system log.

3. The file server of claim 1, wherein the unified slice map volume is a first unified slice map volume associated with an upper deck file system and further comprising:

a second unified slice map volume associated with a lower deck file system, the second unified slice map volume being operative to store second sparse volume metadata, second slice allocation metadata, and second file system metadata.

4. A computer-implemented method for managing metadata comprising:

storing sparse volume metadata and file system metadata within a unified slice map volume in a data storage, the data storage being included in a file server having a file server architecture that includes a file system layer and a passive sparse volume layer, the file system layer having the file system metadata associated therewith describing a state of the unified file system and a set of file system functions, and the passive sparse volume layer having the sparse volume metadata associated therewith describing a set of sparse volume functions and a state of one or more volumes in the passive sparse volume layer, the data storage comprising one or more data storage devices;

performing, by the unified file system, a unified set of functions that include the sparse volume functions and the file system functions, the sparse volume functions being associated with one or more of creating, caching, maintaining, and updating the sparse volume metadata associated with the passive sparse volume layer, wherein the data storage further comprises a plurality of slices of the data storage associated with the unified file system;

storing slice allocation metadata describing a slice allocation status of each slice in the plurality of slices in the unified slice map volume, wherein the slice allocation metadata in the unified slice map volume includes an allocation status entry for each slice in the plurality of slices; and updating, by the unified file system, a slice allocation status entry for a selected slice in the plurality of slices in response to performance of a slice allocation process allocating the selected slice to a logical unit of the data storage.

5. The computer-implemented method of claim 4, wherein the unified slice map volume comprises a set of slice map caches and further comprising:

updating the sparse volume metadata and the file system metadata within the unified slice map volume in response to a change in a state of one or more volumes associated with the passive sparse volume layer.

6. The computer-implemented method of claim 4, wherein the unified slice map volume further comprises a unified file system log, and further comprising:

logging file system transactions and sparse volume transactions in the unified file system log.

7. The computer-implemented method of claim 4, wherein the unified slice map volume further comprises a slice map integrity checker, and further comprising:

performing an integrity check function on file system metadata and sparse volume metadata stored in the unified slice map volume.

8. The computer-implemented method of claim 4, wherein the file system metadata describes a current state of the unified file system attributes of the unified file system and a set of functions of the unified file system.

9. The computer-implemented method of claim 4, wherein the sparse volume metadata describes a current state of one or more volumes associated with the passive sparse volume layer, attributes of one or more volumes associated with the passive sparse volume layer, and a set of sparse volume functions.

10. The computer-implemented method of claim 4, wherein the unified slice map volume is a first unified slice map volume associated with an upper deck unified file system and further comprising:

accessing second sparse volume metadata, second file system metadata, and slice allocation metadata maintained within a second unified slice map volume associated with a lower deck file system.

11. A system for managing metadata comprising:

a data storage comprising one or more data storage devices, the data storage comprising a plurality of slices of the data storage;

a processor coupled to the data storage for accessing data stored on the one or more data storage devices; and a unified file system having a unified slice map volume, wherein the data storage, the processor, and the unified file system are included in a file server having a file server architecture that includes a file system layer and a passive sparse volume layer, the file system layer having associated file system metadata describing a state of the unified file system and a set of file system functions, and the passive sparse volume layer having associated sparse volume metadata describing a set of sparse volume functions and a state of one or more volumes in the passive sparse volume layer, wherein the processor executes computer-executable instructions for storing the file system metadata, the sparse volume metadata, and slice allocation metadata within the unified slice map volume, wherein the processor further executes the computer-executable instructions for performing, by the unified file system, a unified set of functions that include a set of slice allocation functions, the set of file system functions, and the set of sparse volume functions, the sparse volume functions being associated with one or more of creating, caching, maintaining, and updating the sparse volume metadata associated with the passive sparse volume layer, wherein the slice allocation metadata includes a slice allocation status of each slice in the plurality of slices, and wherein the unified file system updates a slice allocation status entry for a selected slice in the plurality of slices in response to performance of a slice allocation process allocating the selected slice to a logical unit of the data storage.

12. The system of claim 11 wherein the unified file system updates the sparse volume metadata stored in the unified slice map volume in response to a change in a state of one or more volumes associated with the passive sparse volume layer.

13. The system of claim 11, wherein the unified slice map volume comprises:
a set of slice map caches,
wherein the unified file system caches sparse volume data and file system data within the set of slice map caches of the unified slice map volume.

14. The system of claim 11, wherein the unified slice map volume comprises:
a unified file system log comprising file system log entries and sparse volume log entries,
wherein the unified file system logs entries include entries associated with file system transactions, and
wherein the sparse volume log entries include entries associated with sparse volume layer transactions.

15. The system of claim 11, wherein the unified slice map volume is a first unified slice map volume associated with an upper deck unified file system and further comprising:
a second unified slice map volume associated with a lower deck file system, the second unified slice map volume being operative to store second sparse volume metadata, second slice allocation metadata, and second file system metadata.

* * * * *